United States Patent [19]

Suzuki et al.

[11] Patent Number: 4,877,574
[45] Date of Patent: Oct. 31, 1989

[54] METHOD OF AND APPARATUS FOR CONTROLLING POWER OF NATURAL CIRCULATION REACTOR

[75] Inventors: Hiroaki Suzuki, Hitachi; Yoshiyuki Kataoka, Ibaraki; Michio Murase, Mito; Kotaro Inoue; Isao Sumida, both of Ibaraki; Shozo Yamanari, Hitachi; Masaki Matsumoto, Katsuta; Satoshi Miura; Koji Hashimoto, both of Hitachi, all of Japan

[73] Assignees: Hitachi, Ltd.; Hitachi Engineering Co., Ltd., both of Tokyo, Japan

[21] Appl. No.: 162,987

[22] Filed: Mar. 2, 1988

[30] Foreign Application Priority Data

Mar. 13, 1987 [JP] Japan .................................. 62-56629

[51] Int. Cl.$^4$ .............................................. B21C 7/00
[52] U.S. Cl. ...................................... 376/216; 376/210
[58] Field of Search ................ 376/210, 211, 215, 216

[56] References Cited

U.S. PATENT DOCUMENTS

| 4,290,850 | 9/1981 | Omori | 376/215 |
| 4,302,288 | 11/1981 | Youngborg | 376/210 |
| 4,651,530 | 3/1987 | Omori | 60/667 |
| 4,738,818 | 4/1988 | Cantineau | 376/211 |
| 4,777,009 | 10/1988 | Singh | 376/211 |
| 4,808,369 | 2/1989 | Yamanari | 376/282 |

*Primary Examiner*—Donald P. Walsh
*Attorney, Agent, or Firm*—Antonelli, Terry & Wands

[57] ABSTRACT

A natural circulation reactor includes a reactor pressure vessel, a cylindrical shroud disposed within the reactor pressure vessel to surround a reactor core and to extend to a position above the reactor core, and a coolant descending passage defined between the reactor pressure vessel and the shroud for allowing the coolant discharged from the top of the reactor core to be again supplied to the bottom of the reactor core. In such a natural circulation reactor, a liquid level of coolant in the coolant descending passage is adjusted on the basis of a reactor power request signal at a position below a liquid level of coolant in the shroud, and thus reactor power is controlled so that it may reach a predetermined reactor power by adjusting the liquid level of coolant in the coolant descending passage.

10 Claims, 8 Drawing Sheets

METHOD OF AND APPARATUS FOR CONTROLLING POWER OF NATURAL CIRCULATION REACTOR

BACKGROUND OF THE INVENTION

1. Field of the Invention

The present invention relates generally to a method of and an apparatus for controlling the power of a natural circulation reactor and, in particular, to a method of and an apparatus for controlling the power of a natural circulation reactor both of which can readily follow up load fluctuations.

2. Description of the Related Art

Japanese Patent Examined Publication No. 43-23117 (U.S. patent application Ser. No. 497,787, filed October 19, 1965) discloses a boiling water reactor in which its in-core flow rate is controlled by control over the flow rate of feedwater, rather than the control over the in-core flow rate (control over reactor power) utilizing a recirculation system. According to the prior art, a reactor pressure vessel is arranged to cause a feedwater sparger to spray inject part of the feedwater and to inject the rest of the feedwater directly into a jet pump, the reactor pressure vessel including a heat exchanger for using feedwater supplied to the jet pump to cool feedwater supplied by the feedwater sparger and sucked by the jet pump in order to prevent cavitation in the jet pump.

Japanese Patent Examined Publication No. 42-15503 discloses a natural circulation reactor in which it is possible to adjust a natural circulation force which acts to cause natural circulation of cooling water in the reactor core. In this prior art natural circulation reactor, a large flow resistance is imparted to the bottom end of an annular cooling water descending passage defined between a reactor pressure vessel and a cylindrical shroud which surrounds the reactor core, whereby the water level of cooling water in the annular cooling water descending passage is maintained at a position higher than the water level of cooling water in the shroud. Adjustment of the natural circulation force in such a reactor can be effected by setting the flow resistance at a suitable level as well as by introducing cooling water into the annual cooling water descending passage at a suitable flow rate.

However, the boiling water reactor described in Japanese Patent Examined Publication No. 43-23117 requires that the heat exchanger be incorporated in the reactor pressure vessel in order to adjust the in-core flow rate, and the internal structure of the reactor pressure vessel inevitably becomes complicated. The heat exchange effectiveness of the heat exchanger is low and the formation of cavitation in the jet pump can only be prevented within a narrow range because of a small temperature difference (about 20° C.) between the feedwater which is directly injected into the jet pump and cooling water within the reactor pressure vessel which is sucked into the jet pump by the action of the directly injected feedwater.

The prior art natural circulation reactor described in Japanese Patent Examined Publication No. 42-15503 has the capability to realize the natural circulation force which acts to cause natural circulation of cooling water in the reactor core, without involving the problems with the reactor disclosed in Japanese Patent Examined Publication No. 43-23117. However, in this prior art natural circulation reactor, the cooling water is heated in the reactor core and converted into steam, the steam being introduced into the annular cooling water passage in which the steam is condensed into a liquid by heat exchange with water which serves as a secondary fluid in the heat exchanger incorporated in the annular cooling water passage, and the thus-obtained liquid being again supplied to the reactor core through the bottom portion thereof. This circulation passing through the reactor core is realized by a natural recirculation force. Prior to the operation of the reactor, the natural recirculation force is adjusted as described previously by setting the flow resistance at a suitable level and by introducing cooling water into the annular cooling water descending passage at a suitable flow rate.

It has recently been desired that such a natural circulation reactor be provided with the capability to follow load fluctuations. The above-described natural circulation reactor of the prior art, however, a load-follow-up operation is impossible since the in-core flow rate during the operation of the reactor cannot be adjusted. Therefore, this type of natural circulation reactor is arranged so that control over reactor power can only be realized by the operation of control rods.

SUMMARY OF THE INVENTION

It is therefore an object of the present invention to provide a method of controlling the power of a natural circulation reactor which method enables adjustment of an in-core flow rate over a wide range and the operation of following up load fluctuations, as well as an apparatus for carrying out the same.

A first feature of the present invention resides in a method of controlling the power of a natural circulation reactor, which comprises the steps of adjusting the liquid level of the coolant in the coolant descending passage on the basis of a reactor power request signal at a position below the liquid level of coolant in the shroud; and providing control over reactor power so that the reactor power may reach a predetermined reactor power by adjusting the liquid level of the coolant in the coolant descending passage.

A second feature of the present invention reside in an apparatus for controlling the power of a natural circulation reactor which apparatus includes coolant supply means communicating with a coolant descending passage defined between a reactor pressure vessel and a shroud for allowing coolant discharged from a reactor core to be returned to the reactor core; means for calculating, on the basis of a reactor power request signal, the liquid level of coolant in the coolant descending passage which assumes a position lower than the liquid level of coolant in the shroud; and control means for adjusting the amount of coolant to be supplied to the coolant descending passage by the coolant supplying means, on the basis of the calculated liquid level of coolant.

In accordance with the present invention, the liquid level of coolant in the coolant descending passage is adjusted at a position below the liquid level of coolant in the shroud on the basis of the reactor power request signal. Accordingly, the in-core flow rate can be adjusted over a wide range, and it is possible to realize reactor power control which follows up load fluctuations due to the adjustment of the in-core flow rate.

BRIEF DESCRIPTION OF THE DRAWINGS

The present invention will be more readily apparent from the following detailed description of a few preferred embodiments thereof when taken in conjunction with the accompanying drawings, in which.

DESCRIPTION OF THE PREFERRED EMBODIMENTS

Preferred embodiments of the present invention will be described below with reference to the accompanying drawings.

First, one preferred embodiment of a natural circulation reactor of the present invention which is applied to a boiling water reactor will be described below with reference to FIGS. 1 and 2.

A reactor pressure vessel 1 has a reactor core 2 in its interior. Within the reactor pressure vessel 1, a cylindrical shroud 3 surrounds the reactor core 2 and extends upwardly. The axial height of the shroud 3 is at least about two times that of the reactor core 2, and the distance between the top end of the reactor core 2 and the top end of the shroud 3 is greater than the axial height of the reactor core 2. A cooling water descending passage 4 is formed in the space between the reactor pressure vessel 1 and the shroud 3. A dryer 5 is disposed at a position above the shroud 3 in the reactor pressure vessel 1. A main steam pipe 7 provides communication between the upper portion of the reactor pressure vessel 1 and a turbine 8. A condenser 9 communicates with a steam outlet of the turbine 8. The condenser 9, through a return pipe 10, communicates with a feedwater sparger 6 located in the cooling water descending passage 4 within the reactor pressure vessel 1. A condensate pump 11, a condensate desalter 12, a feedwater pump 13, a flow rate regulating valve 14, and a feedwater heater 15 are disposed in the return pipe 10 along the length thereof. Reference numeral 33 denotes a control rod which is inserted in the reactor core 2.

The reactor pressure vessel 1 is provided with a level gage 16 for providing a measure of a water level ($L_0$) of the cooling water in the cooling water descending passage 4 as well as a pressure gage 17. A thermometer 20 and a flowmeter 19 are disposed on the return pipe 10. A flowmeter 22 and a pressure gage 23 are disposed on the main steam pipe 7. A signal corrector 24 is connected to the flowmeter 22 and the pressure gage 23. Reference numeral 31 denotes a function generator and reference numeral 32 denotes an overall control device.

Figure 2:
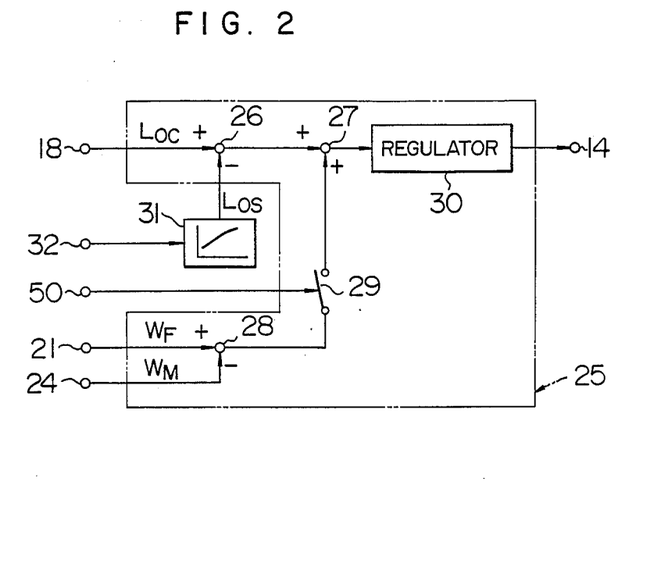
FIG. 2 is a detail view of the construction of a controller incorporated in the power control apparatus shown in FIG. 1.

As shown in FIG. 2, a controller 25 includes adders 25, 27 and 28, a selector swtich 29, and a regulator 30. The adder 26 is connected to the signal corrector 18 and is also connected to the adder 27 and the function generator 31. The adder 28 is connected to the signal correctors 21 and 24. The adder 28 is connected to the adder 27 through the selector switch 29. The regulator 30 is connected to the adder 27 and the flow rate regulating valve 14. The selector switch 29 receives as its input the output of the overall control device 32. The function generator 31 also receives as its input the output of the overall control device 32.

Cooling water which flows through the feedwater sparger 6 into the cooling water descending passage 4 is supplied to the interior of the reactor core 2 in which the cooling water is heated and partially changed into steam. A two-phase flow including the steam and cooling water which have flowed out of the reactor core 2, ascends in the shroud 3. Steam separated from the two-phase flow flows through the dryer 5 into the main steam pipe 7, and is introduced into the turbine 8. Cooling water separated from the two-phase flow descends from the top of the shroud 3 into the cooling water descending passage 4, and is introduced into the reactor core 2 together with cooling water injected by the feedwater sparger. Steam exhausted by the turbine 8 is condensed into water by the condenser 9. The condensate is made to flow from the condenser 9 to the feedwater sparger along the return pipe 10 through the condensate pump 11, the condensate desalter 12, the feedwater pump 13, the flow rate regulating valve 14, and the feedwater heater 15.

The natural circulation reactor to which the above-described embodiment is applied is arranged in such a manner that the cooling water of a primary cooling system which is supplied to the reactor core 2 is changed into steam which, in turn, is introduced into the turbine 8.

Prior to describing the reactor power control employing in-core flow control which is realized by the first embodiment, the principle of the embodiment which enables regulation of the in-core flow rate will be described. The in-core flow control is provided by changing a natural circulation force determined by the difference in water head between the cooling water in the interior of the shroud 3 and that in the exterior of the same. More specifically, as the water level $L_0$ decreases within the cooling water descending passage 4, the difference in pressure between the interior and exterior of the shroud 3 is reduced to weaken a force acting to supply cooling water from the cooling water descending passage 4 into the reactor core 2. When the water level $L_O$ equals a water level $L_I$, a force increases which acts to introduce the cooling water from the cooling water descending passage 4 into the reactor core 2. When the force weakens, the natural circulation force is reduced, but when the former force increases, the natural circulation force increases.

Figure 3:
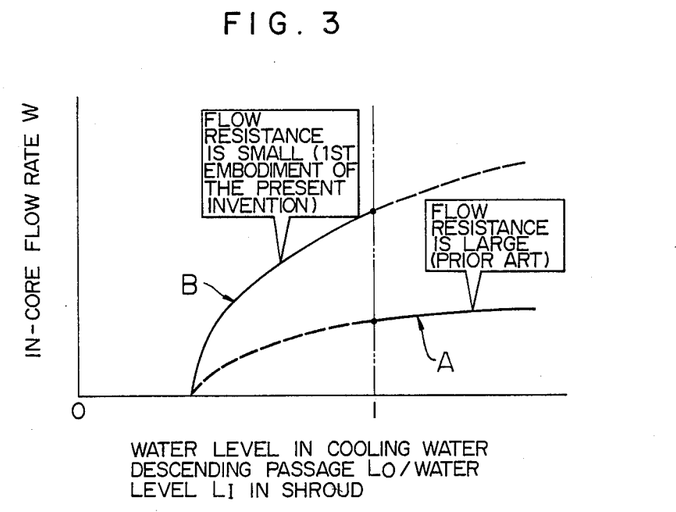
FIG. 3 is a characteristic chart showing the relationship between the water level in a cooling water descending passage and an in-core flow rate in the embodiment shown in FIG. 1.

FIG. 3 is a graph showing variations in an in-core flow rate W with respect to $L_O/L_I$. As the value of $L_O/L_I$ increases, the in-core flow rate W increases. Characteristic A shown by a solid line represents variations in the in-core flow rate W when it is assumed that the ratio of the water level in the cooling water descending passage 4 to that in the shroud 3 is varied (the value of $L_O/L_I$ is greated than 1.0) in the natural circulation reactor disclosed in Japanese Patent Examined Publication No. 42-15503. Characteristic B shown by a solid line represents variations in the in-core flow rate W when the ratio $L_O/L_I$ is varied in this embodiment (value of $L_O/L_I$ is not greater than 1.0). In accordance with this embodiment, the value $(dW/dL_O)$ of the in-core flow rate W differentiated with respect to the water level $L_O$ in the cooling water descending passage 4 is greater than the differential value obtained when the value of $L_O/L_I$ is varied in the previously-described natural circulation reactor of the prior art. Accordingly, the in-core flow control realized by control over the water level in the cooling water descending passage 4 during the operation of the reactor of this embodiment can be provided remarkably easily as compared with the case where it is assumed that the water level in the cooling water descending passage 4 is controlled during the operation of the prior art natural circulation reactor. As seen from FIG. 3, in this preferred embodiment, in-core flow control can be provided over a wide range on the basis of control over the water level $L_0$. However, in this embodiment as well, when the value of $L_O/L_I$ exceeds 1.0, the value of $dW/dL_O$ becomes small, reducing the range over which the in-core flow control can be provided. This results in a reduction in the range over which reactor power can be varied by control over the water level $L_O$. Accordingly, it is desirable that the water level $L_O$ is controlled in the range in which $L_O/L_I$ is not greater than 1.0.

Figure 4:
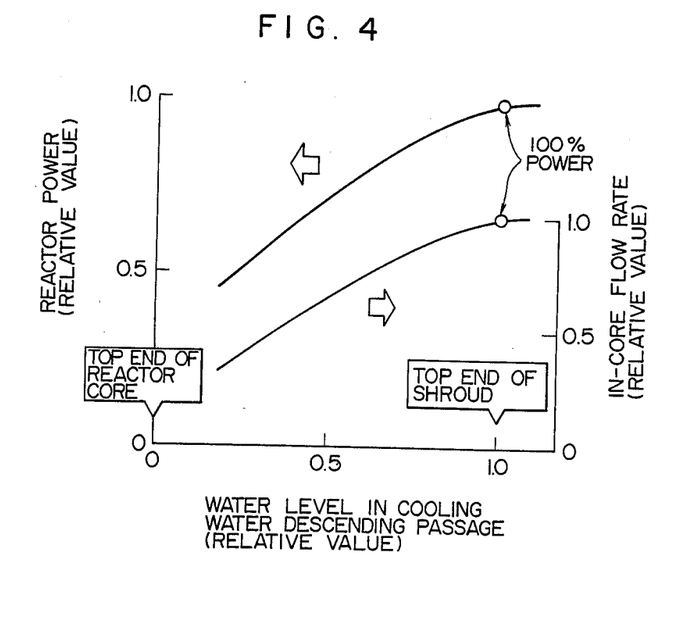
FIG. 4 is a characteristic chart showing relationships between the water level in the cooling water descending passage, the in-core flow rate, and a reactor power in the embodiment shown in FIG. 1.

FIG. 4 is a graph showing variations in the in-core flow rate and reactor power with respect to the water level in the cooling water descending passage 4 during normal operation of the reactor. In FIG. 4, the water level $L_I$ in the shroud 3 is fixed. The void coefficient of reactivity in the reactor core 2 is negative. Accordingly, since the void fraction in the reactor core 2 increases as the in-core flow rate decreases, the level of reactivity decreases so that the level of reactor power falls.

Figure 5:
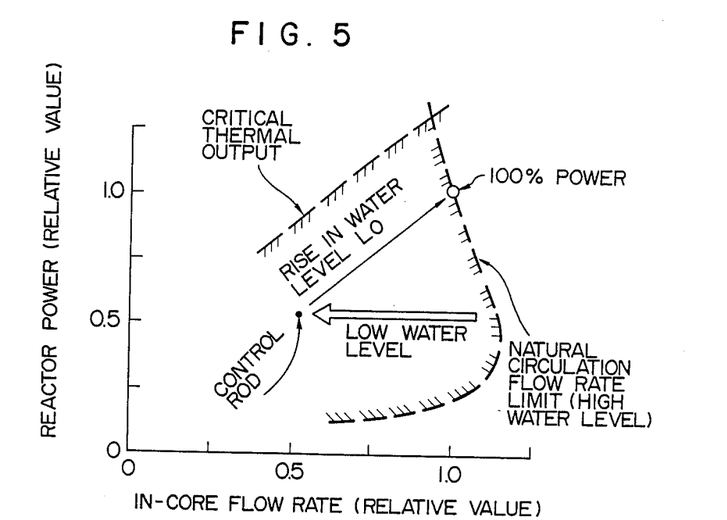
FIG. 5 is a graph illustrating a method of operating the natural circulation reactor which is the embodiment shown in FIG. 1.

In this embodiment, the operating method illustrated in FIG. 5 is carried out employing the characteristics shown in FIG. 4. In FIG. 5, the horizontal axis represents in-core flow rate, and the vertical axis represents reactor power. The high water level in FIG. 5 represents the condition that the water level in the reactor pressure vessel 1 is higher than the top end of the shroud 3.

In the method of operating the natural circulation reactor to which the present invention is applied, while the water level $L_O$ in the cooling water descending passage 4 is held at a predetermined level which is lower than the water level $L_I$ that generally corresponds to the top end of the shroud 3, the control rod 33 is withdrawn from the reactor core 2 to thereby increase the reactor power (up to about 50% of the reactor power).

The withdrawal of the control rod 33 is performed in a reactor power range that is not greater than about 50% which is the specified value of radioactive heat power density (in FIG. 5, the range in which the relative value of the reactor power is not greater than 0.5). Then, while the degree of insertion of the control rod 33 in the reactor core 2 is kept constant, the water level $L_O$ in the cooling water descending passage 4 is raised to increase the hydrostatic head in the exterior of the cooling water descending passage 4. Thus, the difference in pressure between the exterior and interior of the shroud 3 is increased so that the in-core flow rate is increased to 100%. Concurrently with this increase in the in-core flow rate, the reactor power increases from 50% to 100%. The reactor power is controlled within a range which does not exceed a critical thermal output and a natural circulation flow rate limit in FIG. 5. At 100% power, the water level in the exterior of the shroud 3 may be made higher than the top end of the shroud 3. In this case, the water level in the shroud 3 also becomes higher than the top end of the shroud 3, and the water levels in the interior and exterior of the shroud 3 becomes equal to each other. As a result, a single surface of cooling water is formed within the reactor pressure vessel 1. While the water levels in the interior and exterior of the shroud 3 is exceeding the top end thereof to form a single water surface, the reactor power does not vary, i.e., it is kept constant, even if the water level rises or falls (on the assumption that the control rod is not operated).

The specific details of the power control method of the present embodiment, in which control is based upon the above-described principle, will be described below with reference to FIGS. 1 and 2.

The function generator 31 has functions representative of relationships between the water level in the cooling water descending passage 4 and the reactor power within the range of from the top end of reactor core 2 to that of the shroud 3, as shown in FIG. 4. The function generator 31 calculates the water level in the cooling water descending passage 4 that corresponds to a reactor power request signal input to the function generator 31, and outputs the thus-calculated water level as a signal representative of a set water level $L_{OS}$. The function generator 31 is a means for calculating the level of the cooling water in the cooling water descending passage 4 which assumes a position lower than that of the cooling water in the shroud 3, on the basis of the reactor power request signal. The water level $L_O$ in the cooling water descending passage 4 is controlled to be the set water level $L_{OS}$ that corresponds to the reactor power request signal. Accordingly, the in-core flow rate is controlled to be a flow rate which enables the reactor power corresponding to the reactor power request signal.

If the water level in the cooling water descending passage 4 is to be varied (that is, if the reactor power is to be varied by changing the in-core flow rate), the water level in the reactor pressure vessel 1 is controlled by a single-element control method employing solely the water level measured by the level gage 16. If the water level in the cooling water descending passage 4 is to be kept constant (that is, if the in-core flow rate is to be maintained at a constant level), a three-element control method is used which employs output signals of the level gage 16 and the flowmeters 19 and 22.

The overall control device 32 outputs reactor power request signals which correspond to each of set values of high and low loads required for daily load follow-up operations. (The reactor power request signals which correspond to the set high load and low load values are hereinafter referred to as a "high reactor power request signal" and a "low reactor power request signal", respectively.) Now, it is assumed that the natural circulation reactor is operated under the condition of 100% reactor power, which corresponds to the high reactor power request signal. This reactor power is obtained by the operation of increasing the in-core flow rate by means of the previously-described withdrawal of the control rod 33 and a rise in the water level in the cooling water descending passage 4. When the overall control device 32 has caused the level of the reactor power request signal to decrease from the level of the high reactor power request signal to the level of the low reactor power request signal, the selector switch 29 is opened so that the single-element control is exerted on the basis of the output signal of the level gage 16. A selection judgment circuit 50 detects variations in the reactor power request signal output from the overall control device 32, and outputs a switch-off signal. If the selection judgement circuit 50 does not detect any variation in the reactor power request signal during a predetermined period of time, the circuit 50 outputs a switch-on signal. The selector switch 29 is opened by the switch-off signal and closed by the switch-on signal.

The output signals of the level gage 16 and the pressure gage 17 are input to the signal corrector 18. The signal corrector 18 calculates the density of the cooling water within the reactor pressure vessel 1 on the basis of the output signal of the pressure gage 17 and, based on the thus-calculated density, corrects the output signal of the level gage 16. After this correction, the water level signal $L_{OC}$ output from the signal corrector 18 is input to the adder 26 of the controller 25. The low reactor power request signal output from the overall control device 32 is input to the function generator 31. The function generator 31 outputs to the adder 26 a signal representative of the set water level $L_{OS}$ in the cooling water descending passage 4 that corresponds to the input reactor power request signal. The adder 26 calculates the deviation between the measured water level $L_{OC}$ and the set water level $L_{OS}$. The thus-obtained deviation signal ($L_{OC}-L_{OS}$) is input to the regulator 30 through the adder 27. If the water level $L_{OC}$ is greater than the set water level $L_{OS}$, the deviation signal goes positive, and the regulator 30 reduces the opening of the flow rate regulating valve 14 until the deviation signal becomes zero. As the result of this operation, the water level in the cooling water descending passage 4 decreases to the set water level $L_{OS}$. Concurrently with the decrease in the water level in the cooling water descending passage 4, the in-core flow rate is reduced, and the reactor power decreases to the value that corresponds to the low reactor power request signal. The overall control device 32 is arranged to gradually reduce the level of the reactor power request signal to the level of the low reactor power request signal, rather than rapidly change the high reactor power request signal into the low reactor power request signal. When the level of the reactor power reaches the predetermined level of the low reactor power and stops varying, the selector switch 29 is closed by the switch-on signal output from the selection judgment circuit 50. In this manner, the three-element control is performed so that the water level in the cooling water descending passage 4 may be maintained at a constant level.

The following is a description of the specific details of the above-described three elements. The signal corrector 21 calculates the density of cooling water flowing in the return pipe 10 on the basis of the output signal of the thermometer 20, and corrects the flow rate of that cooling water on the basis of the density thus calculated. After being corrected, a feedwater flow rate $W_F$ is output. The signal corrector 24 calculates the density of steam on the basis of the output signal of the pressure gage 23, and corrects the flow rate of main steam on the basis of the density thus calculated. After being corrected, a main steam flow rate $W_M$ is output. The feedwater flow rate $W_F$ and the main steam flow rate $W_M$ are input to the adder 28 of the controller 25. The adder 28 calculates the deviation between these input signals, and inputs a deviation signal to the adder 27. The adder 27 adds up the output signals of the adders 26 and 28 to input the result to the regulator 30. The regulator 30 responds to the output signal of the adder 27 to close or open the flow rate regulating valve 14. In this manner, the water level in the cooling water descending passage 4 is maintained at a constant level.

After the reactor power has been maintained at a predetermined power level corresponding to the low reactor power output request signal for a predetermined period of time, the level of the reactor power request signal is gradually increased from the level of the low reactor power request signal to the level of the high reactor power request signal by a function of the general control device 32. The selector switch 29 is opened on the basis of the variations in the level of the reactor power request signal. In a similar manner to the above-described one, the in-core flow rate is increased under the single-element control and thus the reactor power increases. In this case, the adder 26 outputs a negative deviation signal, and the regulator 30 gradually increases the opening degree of the flow rate regulating valve 14.

The above-described embodiment of the power control device is applicable to not only the aforesaid daily load follow-up operation but also compensation for reactivity and AFC operations whose fluctuation period of reactor power is further short.

If the water level in the cooling water descending passage 4 is varied at a position lower than the water level in the shroud 3, as in the above-described embodiment, the in-core flow rate can be freely set while the reactor is being operated by a natural circulation system. For example, if the water level in the cooling water descending passage 3 is decreased by reducing the flow rate of feedwater to be supplied to the reactor power vessel 1, a hydrostatic water head in the cooling water descending passage 4 decreases and the difference in pressure between the exterior and interior of the shroud 3 is reduced. It is therefore possible to reduce the in-core flow rate. In a typical boiling water reactor, the void coefficient of reactivity in a reactor core thereof is negative. Therefore, as the in-core flow rate decreases, the void fraction of the reactor core increases, and thus the reactivity decreases. As a result, the reactor power decreases to a level which is matched to the decrease in the in-core flow rate, and is kept constant at this level.

In the above-described embodiment, the range in which the in-core flow rate can be regulated is wide, and the range in which the reactor power can be controlled by an in-core flow rate control is remarkably enlarged. Accordingly, the embodiment can easily follow up load fluctuations.

It is to be noted that the pressure gages 17 and 23 and the thermometer 20 may be omitted and the output signals of the level gage 16 and the flowmeter 19 and 22 may be input directly to the controller 25 without the need for correction employing output signals of the pressure gages 17, the thermometer 20 and the pressure gage 23. In this case, the accuracy of in-core flow control slightly deteriorates as compared with the above-described case.

The above-described embodiment is arranged to control the opening of the flow control valve 14 on the basis of the output signal of the controller 25. However, the rotational speed of the feedwater pump 13 may be controlled on the basis of the output signal.

A second preferred embodiment of the present invention will be described below with reference to FIG. 6 in which like reference numerals are used to denote the similar or corresponding elements used in the first embodiment.

A natural circulation reactor to which the second embodiment is applied is an indirect cycle reactor having a primary cooling system and a secondary cooling system. The primary cooling system is constituted by a closed loop which includes the reactor core 2, the interior of the shroud 3, and the cooling water descending passage 4. The secondary cooling system is constituted by another closed loop which includes a heat exchanger 34 located in the cooling water descending passage 4, the main steam pipe 7 and the return pipe 10 both of which are connected to the heat exchanger 34, the turbine 8 (FIG. 1), and so forth. The construction which is provided along the main steam pipe 7 extending to the pipe 10 is the same that shown in FIG. 1. Within the reactor core 2, the cooling water is heated by heat generated by the nuclear fission of a nuclear fuel, and is partially changed into steam. Therefore, the difference in pressure between the interior and exterior of the shroud 3 takes place, and thus natural circulation is established in which the cooling water ascends in the shroud 3 and descends in the cooling water descending passage 4. Heat generated in the reactor core 2 is transmitted to the secondary cooling water which is supplied to the heat exchanger 34 through the return pipe 10. Steam generated at the heat exchanger 34 by this heat exchange is supplied to the turbine 8, in which the steam is condensed and returned to the heat exchanger 34. Steam generated in the reactor core 2 is introduced into the reactor core 2 together with the cooling water which flows down from the top of the shroud 3 to the interior of the cooling water descending passage 4. Since the cooling water which is cooled by the heat exchanger 34 descends in the cooling water descending passage 4, the level of natural circulation force increases within the reactor pressure vessel 1. An accumulation tank 35 communicates with the reactor pressure vessel 1 through a pipe 52. A pressure gas tank 36 communicates with the accumulation tank 35 through a gas supply pipe 37 having a control valve 38. A gas exhaust pipe 39 having a control valve 40 is connected to the top of the accumulation tank 35.

Figure 1:
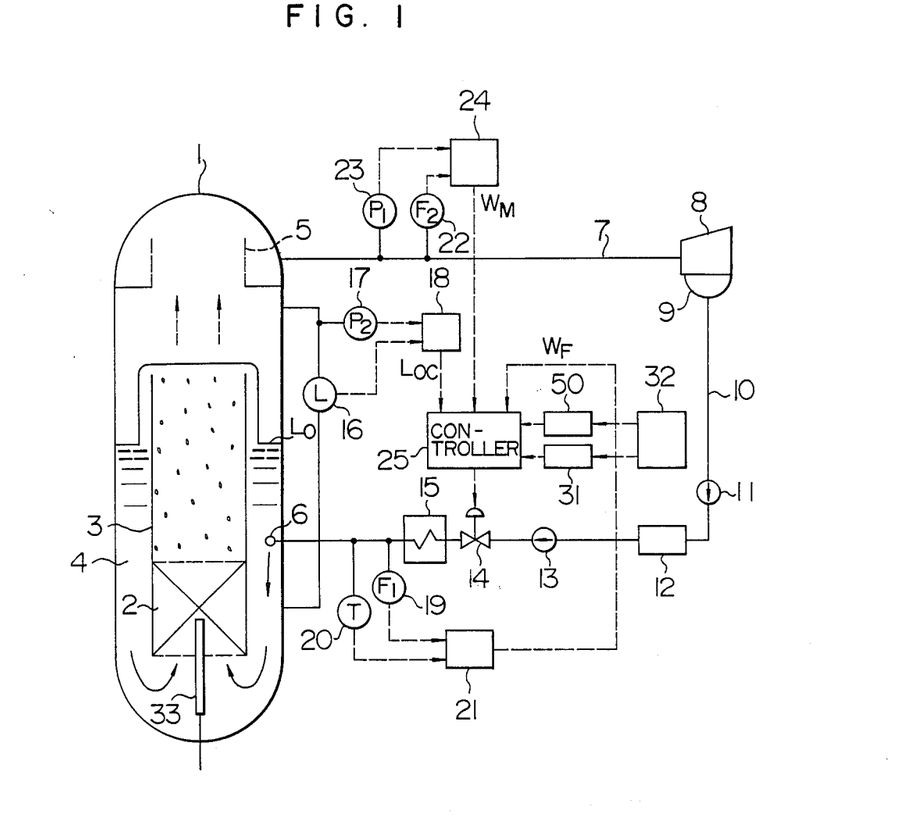
FIG. 1 is a system diagram illustrating a power control apparatus for a natural circulation reactor which constitutes a preferred embodiment of the present invention.

As in the embodiment shown in FIG. 1, in this second embodiment as well, the relationships between the water level in the cooling water descending passage 4, the in-core flow rate, and the reactor power are established as shown in FIGS. 4 and 5. Accordingly, if the water level in the cooling descending passage 4 is adjusted, it is possible to control the reactor power in accordance with load fluctuations.

Now, a concrete method of controlling the water level in the cooling water descending passage 4 will be described below with reference to FIG. 6.

The water level in the cooling water descending passage 4 is accurately calculated by correcting the output signal of the level gage 16 by means of the signal corrector 18 in accordance with the density of the cooling water which is obtained on the basis of the output signal of the pressure gage 17. The water level $L_{OC}$ obtained by the signal corrector 18 is transmitted to a controller 44. As shown in FIG. 7, the controller 44 is provided with the adder 26, a regulator 30, a judgment device 44A, and switches 44B and 44C. The adder 26 receives as its input the water level $L_{OC}$ and the set water level $L_{OS}$ that corresponds to the reactor power request signal output from the function generator 31. The adder 26 calculates the deviation ($L_{OC}-L_{OS}$) between the water level $L_{OC}$ and the set water level $L_{OS}$. If the deviation ($L_{OC}-L_{OS}$) is negative, the regulator 30A supplies a signal representative of temporary opening of the control valve 38 to a control valve operating device 45. If the deviation ($L_{OC}-L_{OS}$) is positive, the regulator 30A supplies a signal indicative of the temporary opening of the control valve 40 to a control valve operating valve 46. As described later, the switches 44B and 44C are closed except when the judgment device 44A outputs switch-off signals. When the control valve operating device 45 receives a signal representative of the opening of the control valve 38, the device 45 opens the control valve 38 for a predetermined period of time. When the control valve 38 is temporarily opened, a predetermined amount of a gas flows into the accumulation tank 35 from the pressure gas tank 36 whose interior is maintained at a high pressure, thereby pressing down the water level in the accumulation tank 35. Thus, the cooling water in the accumulation tank 35 is poured into the reactor pressure vessel 1 to raise the water level in the cooling water descending passage 4, thereby increasing the reactor power. The pressure gas tank 36 is preferably charged with an inactive gas, for example, nitrogen.

On the other hand, when the control valve 40 is temporarily opened by the control valve operating device 46, a predetermined amount of gas in the accumulation tank 35 flows into a cover gas processing system (not shown) through the gas exhaust pipe 39, and the cooling water in the reactor pressure vessel 1 flows into the accumulation tank 35. Therefore, the water level in the cooling water descending passage 4 decreases, and hence the reactor power decreases. The above-described opening and closing operations of the control valve 38 or 40 are repeated at predetermined time intervals until the water level in the cooling water descending passage 4 approaches the set water level $L_{OS}$.

It is to be noted that the water level in the accumulation tank 35 is determined by the signal corrector 43 on the basis of the output signals of the level gage 41 and the pressure gage 42 by taking into account the density of the cooling water. The water level signal thus obtained is supplied to the judgment device 44A of the controller 44. When a water level $L_A$ in the accumulation tank 35 reaches a predetermined position at the bottom end of the accumulation tank 35, the judgment device 44A opens the switch 44B, while when the water level $L_A$ reaches a predetermined level at the top portion of the accumulation tank 35, the judgment device 44A opens the switch 44C. Therefore, when the water level $L_A$ reaches the bottom end of the accumulation tank 35, the transmission of switch-off signals from the regulator 30A to the control valve operating device 45 is ceased. On the other hand, when the water level $L_A$ reaches the top end of the accumulation tank 35, the transmission of switch-off signals from the regulator 30A to the control valve operating device 46 is ceased. Accordingly, it is possible to prevent a gas from the accumulation tank 35 into the reactor pressure vessel 1 and also to prevent the cooling water in the reactor pressure vessel 1 from flowing into the cover gas processing system. As another example, if any rupture is formed in the piping of the heat exchanger 34 to cause a loss-of-coolant accident such that the cooling water flows out of the reactor pressure vessel 1, the cooling water in the accumulation tank 35 can be poured into the reactor pressure vessel 1 until the water level in the accumulation tank 35 reaches the bottom end thereof so that the water level in the cooling water descending passage 4 may be maintained at the set water level $L_{OS}$. Accordingly, the accumulation tank 35 also serves as a reactor core cooling system at the time of emergency. Therefore, it is possible to reduce the installed capacity required for such an emergency reactor core cooling system.

It is to be noted that, in order to prevent the mixing of a cover gas into water, a float having a density smaller than water is preferably disposed on the surface of the water in the accumulation tank 35. It will be appreciated that the second embodiment of the water-level controlling method is also applicable to the direct cycle natural circulation reactor shown in FIG. 1.

As described above, with the secone embodiment, it is possible to produce the same effect as the embodiment shown in FIG. 1 and, furthermore, to reduce the installed capacity required for the emergency reactor core cooling system.

Figure 6:
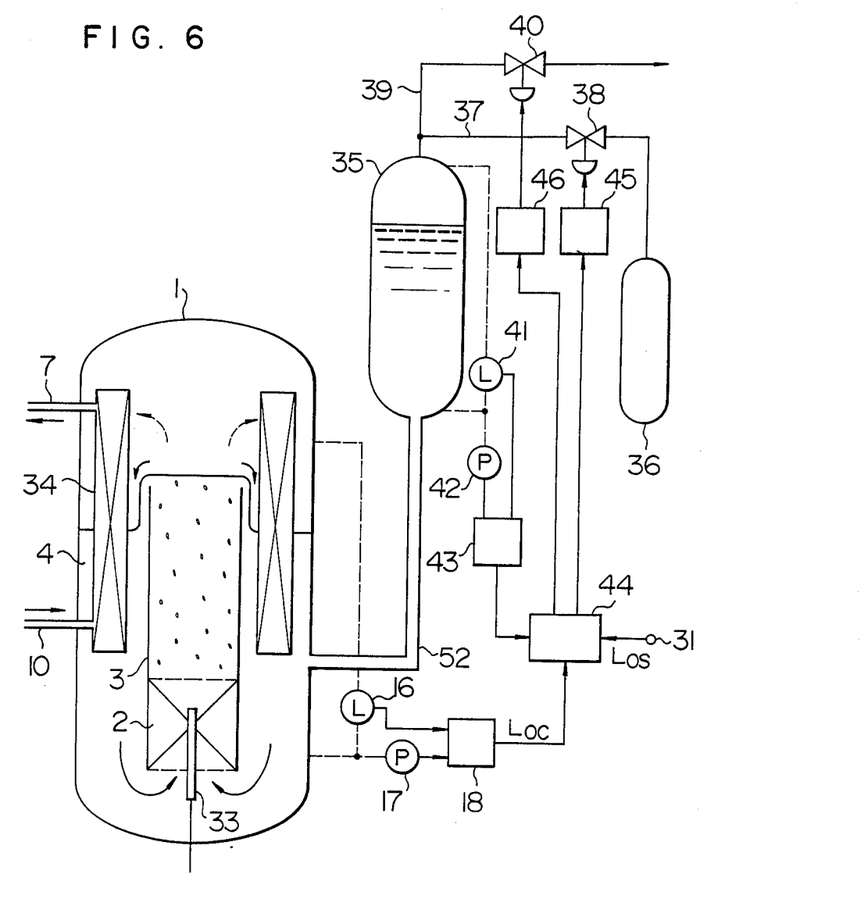
FIG. 6 is a system diagram of another embodiment of the present invention.
Figure 7:
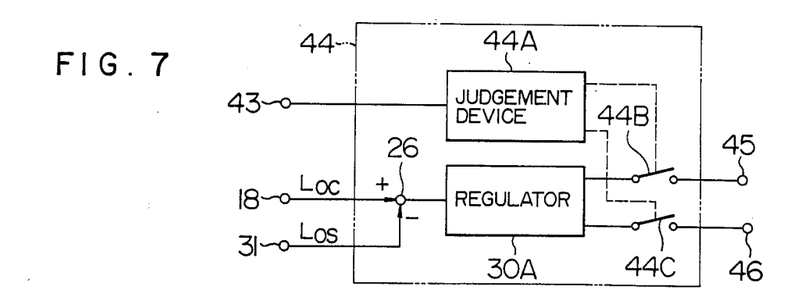
FIG. 7 is a detail view of the construction of a controller incorporated in the power control apparatus shown in FIG. 6.
Figure 8:
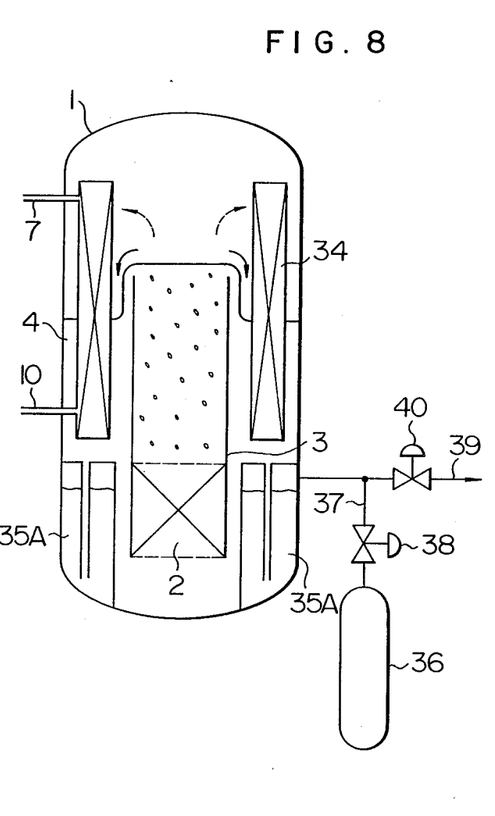
FIG. 8 is a system diagram of another embodiment of the present invention.

As illustrated in FIG. 8, the accumulation tank 35 in the second embodiment shown in FIG. 6 may be incorporated in the reactor pressure vessel 1. In FIG. 8, the accumulation tank is represented by reference numeral 35A. With this arrangement, it is possible to produce not merely the effects achieved by the embodiment of FIG. 6, but also the pipe 52 provided between the accumulation tank 35 and the reactor pressure vessel 1 may be omitted. Further, it is possible to effectively utilize the space between the reactor pressure vessel 1 and the shroud 3 which is enlarged so as to accommodate the heat exchanger 34.

Figure 9:
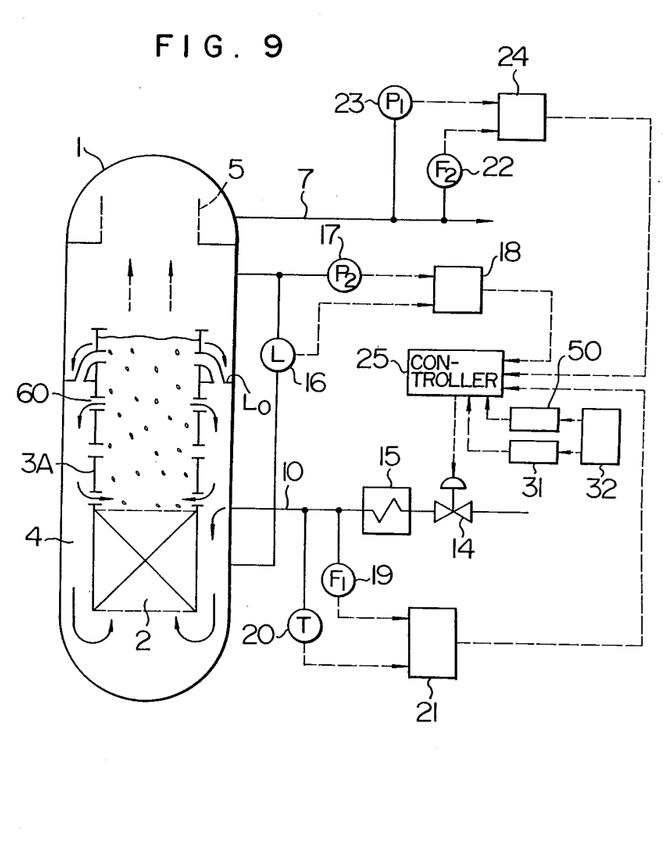
FIG. 9 is a system diagram of another embodiment of the present invention.

Another embodiment of the present invention will be described below with reference to FIG. 9.

Like reference numerals in FIG. 1 are used to denote the similar or corresponding elements relative to the first embodiment shown in FIG. 1. This embodiment differs from the embodiment of FIG. 1 in that, above the top end of the reactor core 2, a shroud 3A is provided with a plurality of openings 60 which are arranged in the heightwise direction of the shroud 3A for communication between the interior and exterior thereof.

Figure 10:
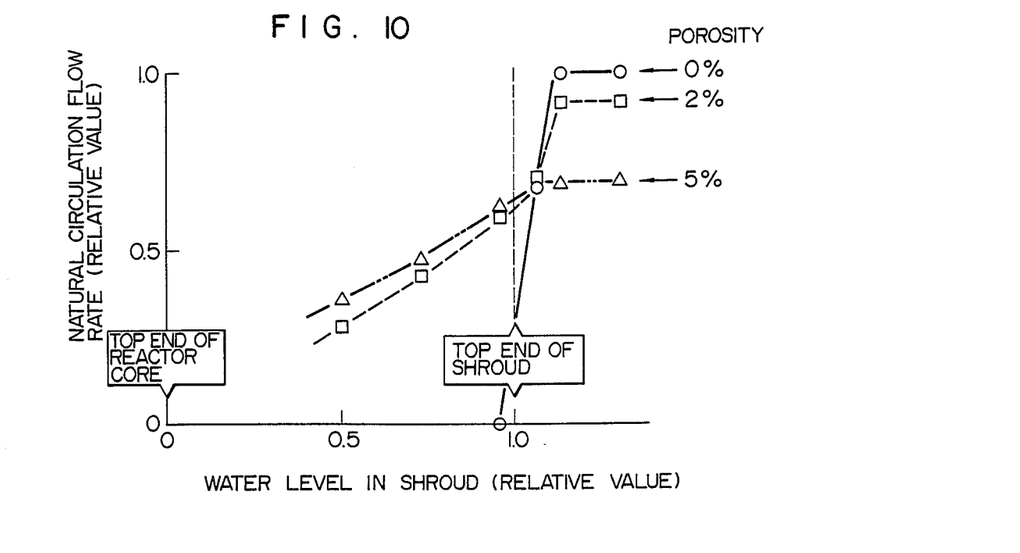
FIG. 10 is a characteristic chart illustrating the relationship between the water level in a shroud and the flow rate of natural circulation.

With reference to FIG. 10, there is described the relationship between the water level in the shroud 3A and the natural-circulation flow rate when the openings 60 are formed for communication between the exterior and interior of the shroud 3A. FIG. 10 is a graph showing the result of experiments conducted with a natural circulation reactor simulator. Each porosity illustrated in FIG. 10 is the value of the total flow passage area of the openings 60 which is divided by the surface area of the portion of the shroud 3A that is defined above the top of the reactor core 2. If the porosity is zero, that is, if there is no opening 60, the natural-circulation flow rate becomes zero when the water level in the shroud 3A falls down from the top end of the shroud 3A owing to abnormal conditions. However, in a case where the porosity is 2% or 5%, even if the water level in the shroud 3A falls down from the top end of the shroud 3A, the natural circulation is ensured since the openings 60 are disposed for communication between the exterior and interior of the shroud 3A. In a case where the water level in the shroud 3A is substantially higher than the top end of the shroud 3A (the water level in the cooling water descending passage 4 is also substantially higher than the top end of the shroud 3A), if the porosity is 5%, the cooling water flows from the exterior of the shroud 3A to its interior at a high flow rate through the openings 60 formed in the portion of the shroud 3 near to the reactor core 2, and the natural-circulation flow rate is reduced by about 30%. However, if the porosity is 2%, the natural-circulation flow rate substantially balances the flow rate of the cooling water which flows from the exterior to interior of the shroud 3A through the openings 60 formed in the portion of the shroud 3A near to its top end, and therefore the natural-circulation flow rate decreases only by about 7%.

Figure 11:
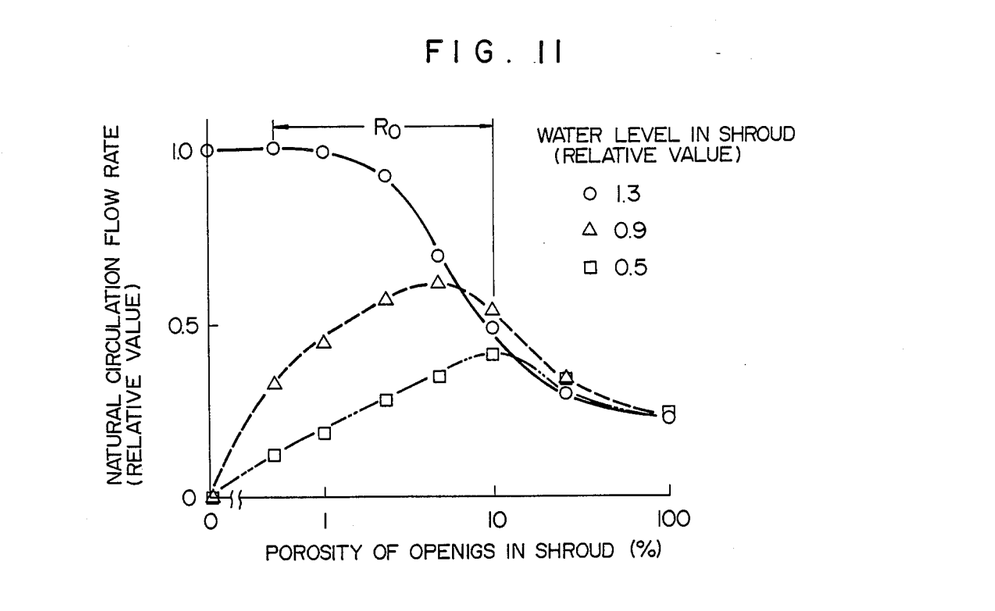
FIG. 11 is a characteristic chart illustrating the relationship between the porosity of the shroud and the flow rate of natural circulation.
Figure 12A:
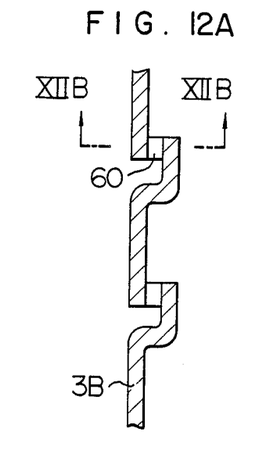
FIG. 12A shows in longitudinal section another form of opening in the shroud.
Figure 12B:
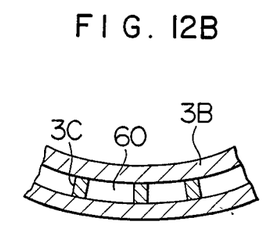
FIG. 12B is a cross section taken along the line XIIB—XIIB of FIG. 12A.

FIG. 11 is a graph showing the relationship between the porosity and the natural-circulation flow rate which has been obtained by experiments with the same simulator. In the case of porosity of 0.5%, when the water level in the shroud 3A is substantially higher than the top end of the shroud 3A, the natural-circulation flow rate does not substantially decrease. It is therefore possible to ensure the required level of the natural-circulation flow rate even when the water level in the shroud 3A decreases. On the other hand, if the porosity is 10%, the natural-circulation flow rate decreases by about 50% when the water level in the shroud 3A is high. However, even if the water level in the shroud 3A decreases, it is possible to assure a high flow rate of natural circulation. Therefore, it is desirable that the porosity of the openings 60 ranges from 0.5% to 10%. In particular, if the porosity is 2%, the natural-circulation flow rate does not substantially decrease during the normal operation in which the water level in the shroud 3A is a little higher than the top end of the shroud 3 (the water level in the cooling water descending passage 4 assumes the same level). Therefore, even if the water level in the shroud 3A falls down from the top end of the shroud 3A at the time of a loss-of-coolant accident in which the cooling water flows out of the reactor pressure vessel 1 because of ruptures in a piping or the like, a sufficient level of natural circulation flow rate is assured so that the cooling characteristics of the reactor core 2 can be improved. When, in particular, the cooling characteristics during an accident need to be improved, it is of course possible to increase the porosity to 2% or more. As illustratively shown in FIG. 9, the circular openings 60 are formed in the shroud 3A. However, as shown in FIG. 12, steel plates which constitute in combination the shroud 3B may each be bent as illustrated and united through ribs 3C by welding to thereby form the openings 60 between the respective steel plates.

If the shroud 3A having the just-described openings 60 is employed, relationships similar to those shown in FIG. 4 are established between the water level in the cooling water descending passage 4, the in-core flow passage, and the reactor power. Accordingly, it is possible to perform a similar load follow-up operation to that shown in FIG. 5 (the same operation as that of the embodiment shown in FIG. 1). Furthermore, as can be seen from FIG. 10, the third embodiment can be controlled over a wide range of the water level in the shroud 3A. Also, even if the water level in the shroud 3A falls down from the top end of the shroud 3A, since the natural-circulation flow rate does not rapidly decrease, a sufficient operational margin can be attained during a normal operation. Similarly to the embodiment shown in FIG. 1, the controller 25 provides control over the water level in the exterior of the shroud 3A.

In this manner, the third embodiment is capable of providing the same effect as the embodiment shown in FIG. 1. In addition, even if the water level in the shroud 3A decreases by an accident, the natural circulation can be assured and thus the cooling characteristics of the reactor core 2 is improved.

Figure 13:
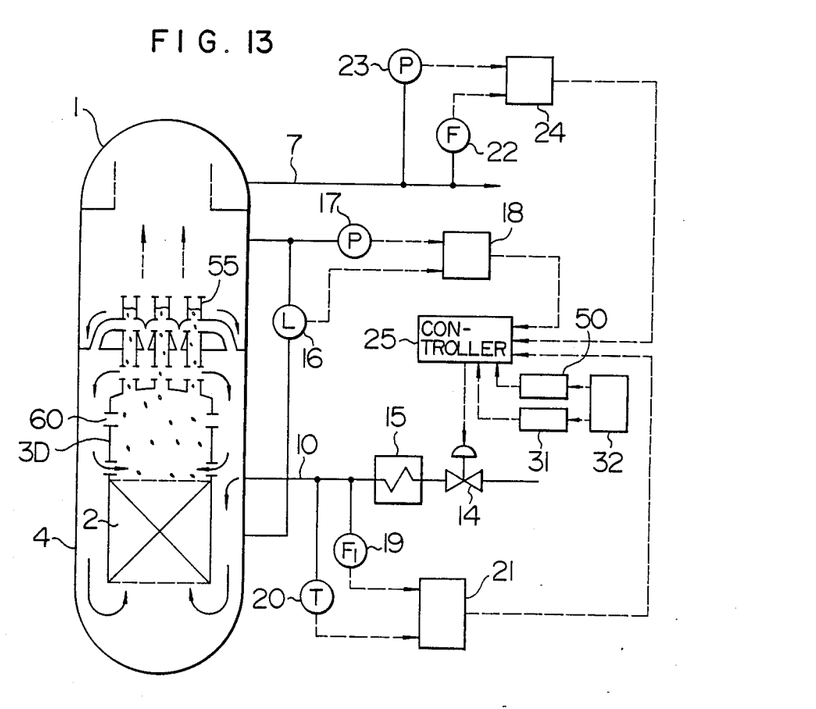
FIG. 13 is a system diagram of another embodiment of the present invention.

Yet another embodiment of the present invention will be described below with reference to FIG. 13. This fourth embodiment differs from the third embodiment of FIG. 9; in that a plurality of cylindrical extensions 55 are formed on the top of a shroud 3D, each having a flow passage with a small cross-sectional area; in that the flow passage area of the interior of the shroud 3D is reduced at its upper portion; and in that the porosity of the openings 60 for communication between the exterior and interior of the shroud 3D is progressively enlarged in the heightwise direction of the shroud 3D. A plurality of openings are also formed in the periphery of each of the cylindrical extensions 55. Since the flow passage area of the interior of the shroud 3D is reduced at its upper portion, flow resistance in the shroud 3D increases, and thus the in-core flow rate is slightly reduced. However, if the water level in the cooling water descending passage 4 is the same, the amount of cooling water possessed by the reactor pressure vessel 1 is larger than that of the embodiment shown in FIG. 9. For this reason, in a case where the water level in the reactor pressure vessel 1 decreases due to a loss-of-coolant accident, the speed of decrease slows down. Also, since the porosity of the openings 60 for communication between the interior and exterior of the shroud 3D is progressively enlarged in the heightwise direction of the shroud 3D, an increased flow rate of cooling water flows from the interior to exterior of the shroud 3D through the openings formed in the portion of the shroud 3D near to the top thereof. As compared with the case in which the porosity is made uniform in the heightwise direction of the shroud, the in-core flow rate increases if the porosity is the same.

Figure 14A:
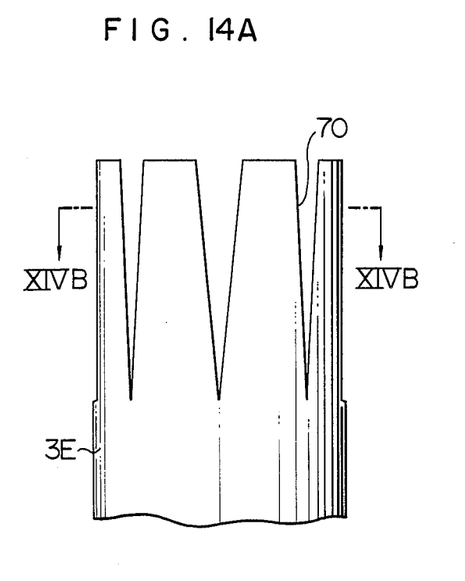
FIG. 14A is a side elevation of another form of the shroud.
Figure 14B:
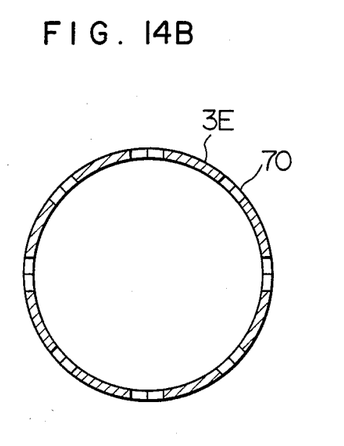
FIG. 14B is a cross section taken along the line XIVB—XIBV of FIG. 14A.

As shown in FIGS. 14A and 14B, slits 70, which extend in the heightwise direction and which progressively expands in the horizontal direction, may be formed in order to progressively increase the porosity in that direction. In this embodiment, the porosity is made large at a portion near the top of the shroud 3D. Therefore, it is possible to assure a sufficient in-core flow rate even if the water level in the shroud 3D is lower than the top end of the shroud 3D. Accordingly, it is possible to control the in-core flow rate while the water level in the shroud 3D is normally kept lower than the top of the shroud 3D. Therefore, since the in-core flow rate smoothly varies, the reactor power can be easily controlled.

As described above, in the fourth embodiment, since the amount of cooling water possessed by the reactor 2 is large during a normal operation, safety during an accident is improved. The fourth embodiment produces a further effect of facilitating control over reactor power during the normal operation. It is of course possible to achieve the same effect as the embodiment shown in FIG. 9.

While the above provides a full and complete disclosure of the invention, various modifications, alternative constructions and equivalents may be employed without departing from the true spirit and scope of the invention. Therefore, the above description and illustrations should not be construed as limiting the scope of the invention, which is defined solely by the appended claims.

What is claimed is:

1. In a method of controlling the power of a natural circulation reactor having a reactor pressure vessel, a cylindrical shroud disposed within said reactor pressure vessel to surround a reactor core and to extend to a position above said reactor core, and a coolant descending passage defined between said reactor pressure vessel and said shroud for allowing coolant discharged from said reactor core to be returned to said reactor core, the improvement comprising the steps of:

adjusting the liquid level of said coolant in said coolant descending passage on the basis of a reactor power request signal at a position below the liquid level of coolant in said shroud, and providing control over reactor power so that said reactor power may reach a predetermined reactor power by adjusting said liquid level of said coolant in said coolant descending passage.

2. In a method of controlling the power of a natural circulation reactor having a reactor pressure vessel, a cylindrical shroud disposed within said reactor pressure vessel to surround a reactor core and to extend to a position above said reactor core, and a coolant descending passage defined between said reactor pressure vessel and said shroud for allowing coolant discharged from said reactor core to be returned to said reactor core, the improvement comprising the the steps of:

adjusting the liquid level of said coolant in said coolant descending passage at a position below the liquid level of coolant in said shroud under feedwater flow control based on a reactor power request signal; and providing control over reactor power so that said reactor power may reach a predetermined reactor power by adjusting said liquid level of said coolant in said coolant descending passage.

3. In a method of controlling the power or a natural circulation reactor having a reactor pressure vessel, a cylindrical shroud disposed within said reactor pressure vessel to surround a reactor core and to extend to a position above said reactor core, and a coolant descending passage defined between said reactor pressure vessel and said shroud for allowing coolant discharged from said reactor core to be returned to said reactor core, the improvement comprising the steps of:

adjusting, on the basis of a reactor power request signal, the liquid level of said coolant in said coolant descending passage at a position below the liquid level of coolant in said shroud by controlling the liquid level of coolant in a cooling tank communicating with said coolant descending passage; and providing control over reactor power so that said reactor power may reach a predetermined reactor power by adjusting said liquid level of said coolant in said coolant descending passage.

4. In an apparatus for controlling the power of a natural circulation reactor having a reactor pressure vessel, a cylindrical shroud disposed within said reactor pressure vessel to surround a reactor core and to extend to a position above said reactor core, and a coolant descending passage defined between said reactor pressure vessel and said shroud for allowing the coolant discharged from said reactor core to be returned to said reactor core, the improvement comprising:

coolant supplying means communicating with said coolant descending passage for supplying said coolant to said reactor pressure vessel;

means for calculating, on the basis of a reactor power request signal, the liquid level of said coolant in said coolant descending passage which is lower than the liquid level of coolant in said shroud; and control means for adjusting the amount of coolant to be supplied to said coolant descending passage by said coolant supplying means on the basis of said calculated liquid level of said coolant.

5. An apparatus for controlling the power of a natural circulation according to claim 4, further comprising:

a liquid level detector disposed on said reactor pressure vessel for providing a measure of said liquid level of said coolant in said coolant descending passage; and control means for adjusting the amount of said coolant to be supplied by said coolant supply means on the basis of a deviation between said liquid level of said coolant measured by said liquid level detector and said liquid level of said coolant calculated on the basis of said reactor power request signal.

6. In an apparatus for controlling the power of a natural circulation reactor having a reactor pressure vessel, a cylindrical shroud disposed within said reactor pressure vessel to surround a reactor core and to extend to a position above said reactor core, and a coolant descending passage defined between said reactor pressure vessel and said shroud for allowing coolant discharged from said reactor core to be returned to said reactor core, the improvement comprising:

feedwater supply means communicating the said coolant descending passage for introducing feedwater from a condenser to said reactor pressure vessel, said feedwater supply means including adjustment means for adjusting the flow rate of said feedwater; and means for controlling said adjustment means on the basis of said reactor power request signal so that said liquid level of coolant in said coolant descending passage may be made lower than said liquid level of coolant in said shroud.

7. An apparatus for controlling the power of a natural circulation reactor according to claim 6, comprising:

a liquid level detector disposed on said reactor pressure vessel for providing a measure of the liquid level of coolant in said coolant descending passage;

a first flowmeter disposed on said feedwater supply means;

said reactor pressure vessel;

a second flowmeter for providing a measure of the flow rate of steam discharged from said reactor pressure vessel; and control means for adjusting the flow rate of said feedwater to be supplied to said feedwater supply means on the basis of said liquid level of coolant calculated on the basis of said reactor power request signal as well as output signals of said liquid level detector, said first flowmeter and said second flowmeter.

8. In an apparatus for controlling the power of a natural circulation reactor having a reactor pressure vessel, a cylindrical shroud disposed within said reactor pressure vessel to surround a reactor core and to extend to a position above said reactor core, and a coolant descending passage defined between said reactor pressure vessel and said shroud for allowing the coolant discharged from said reactor core to be returned to said reactor core, the improvement comprising:

a coolant packed tank communicating with said coolant descending passage;

adjustment means for adjusting the internal pressure of said coolant packed tank;

calculation means for calculating the liquid level of said coolant in said coolant descending passage which assumes a position lower than the liquid level of coolant in said shroud on the basis of a reactor power request signal; and control means for controlling said adjustment means on the basis of said calculated liquid level of coolant.

9. An apparatus for controlling the power of a natural circulation according to claim 8, further comprising:

a liquid level detector disposed on said reactor pressure vessel for providing a measure of said liquid level of said coolant in said coolant descending passage; and control means for controlling said means for adjusting on the basis of a deviation between said liquid level of said coolant measured by said liquid level detector and said liquid level of said coolant calculated on the basis of said reactor power request signal.

10. In an apparatus for controlling the power of a natural circulation reactor having: a reactor pressure vessel; a cylindrical shroud disposed within said reactor pressure vessel to surround a reactor core, extending to a position above said reactor core, and having at least one transverse opening formed in the portion of said shroud that is defined above said reactor core; and a coolant descending passage defined between said reactor pressure vessel and said shroud for allowing coolant discharged from said reactor core to be returned to said reactor core, the improvement comprising:

coolant supply means communicating with said coolant descending passage for supplying said coolant to said reactor pressure vessel;

means for calculating, on the basis of a reactor power request signal, the liquid level of said coolant in said coolant descending passage which assumes a position lower than the liquid level of coolant in said shroud; and control means for adjusting the amount of coolant to be supplied to said coolant descending passage by said coolant supply means on the basis of said calculated liquid level of coolant.

* * * * *